(12) United States Patent
Yang

(10) Patent No.: US 6,261,667 B1
(45) Date of Patent: Jul. 17, 2001

(54) MAT USED IN CARS

(75) Inventor: Ming-Shun Yang, Taipei (TW)

(73) Assignee: Formosa Saint Jose Corp., Taipei (TW)

( * ) Notice: Subject to any disclaimer, the term of this patent is extended or adjusted under 35 U.S.C. 154(b) by 0 days.

(21) Appl. No.: 09/354,067

(22) Filed: Jul. 15, 1999

(30) Foreign Application Priority Data

Jul. 29, 1998 (CN) .................................................. 87212432

(51) Int. Cl.⁷ .............................. B32B 3/00; B62D 25/20; A47K 7/02
(52) U.S. Cl. .............................. 428/172; 428/85; 428/95; 428/192; 296/97.23; 15/215
(58) Field of Search .................................. 428/95, 85, 172, 428/78, 167, 192, 318.4; 296/97.23; 5/417, 420; 15/215

(56) References Cited

U.S. PATENT DOCUMENTS 5,725,926 * 3/1998 Wang ...................................... 428/78

* cited by examiner

*Primary Examiner*—Donald J. Loney
(74) *Attorney, Agent, or Firm*—Erik M. Arnhem

(57) ABSTRACT

An improved mat used in cars includes an upper polyester fabric layer, a middle polyvinglchloride (PVC) layer, and a foam-coated under net layer. All three layers are placed together, and bound to form a laminated plate-shaped object. The plate-shaped mat is formed by multiple symmetrical umbos that define multiple symmetrical bevel grooves between these umbos. The sideways grooves can collect the muck from a person's shoes. When convenient, a person can take the mat out to wash without dirtying the carpet. Foam particles on the under net layer of the mat prevent the mat from moving on the carpeted floor of the vehicle.

2 Claims, 4 Drawing Sheets

MAT USED IN CARS

BACKGROUND OF THE INVENTION

The invention relates to a floor mat used in cars. People often use floor mats the car carpet, because the mat prevents mud, dirt and gravel on the person's shoes from getting into the carpet. The floor mat of the present invention has multiple symmetrical bevel grooves for collecting water tracked on the mat the mat can be washed to remove any collected dirt or residue.

Usually, people have an ornamental carpet in a car for beautifying the interior of the car. However, in order to keep the carpet from becoming soiled by dirt from a person's shoes, many people place a set of mats on the carpet (four pieces, two for the front seats and two for the rear seats). Conventional car mats are putted on the carpet without any design to fix the mat with the carpet, when people step on the mat, the mat will be moved. It may influence the safety of driving and defeats the purpose of the mat of its intended covering area. It is therefore need to be improved.

Additionally, the design of the conventional car mat is flat, therefore, after using for a while, the sludge, gravel, and rainwater on the shoes will not only dirty the carpet, but also deface the inside of the car. It is the defect of the conventional car mat.

Due to the defect of the conventional car mats on practice, the inventor designs an improved structure of car mat. The structure of the car mat is not only to improve the function of avoiding slide, but also to collect the sludge and gravel on the shoes, and will not dirty the carpet. Therewith, these multiple symmetrical bevel grooves formed in the plate-shaped car mat can collect the water tracked on the mat the mat is designed for easy cleaning or washing.

SUMMARY OF THE INVENTION

An improved floor mat used in cars includes an upper polyester fabric layer, a middle polyvinglchloride (PVC) plate or layer, and an under net lining or layer. All three layers are laminated together, to form a unitary plate-shaped object. The plate-shaped mat is in bossed to form multiple symmetrical umbos (or raised areas) that define multiple symmetrical bevel dirt collection grooves. The grooves can collect the muck from a person's shoes When necessary, the person can take the mat out for washing or cleaning without dirtying the carpet. Multiple foam particles are created on the under net lining of the mat to prevent the mat from shifting on the carpeted floor of the vehicle.

DETAILED DESCRIPTION

As FIGS. 1, 2, 3, and 4 show a car floor mat 100 of this invention consisting of an upper polyester fabric layer (10), a middle polyvinglchloride (PVC) plate or layer (20), and an under net lining or layer (30).

Figure 1:
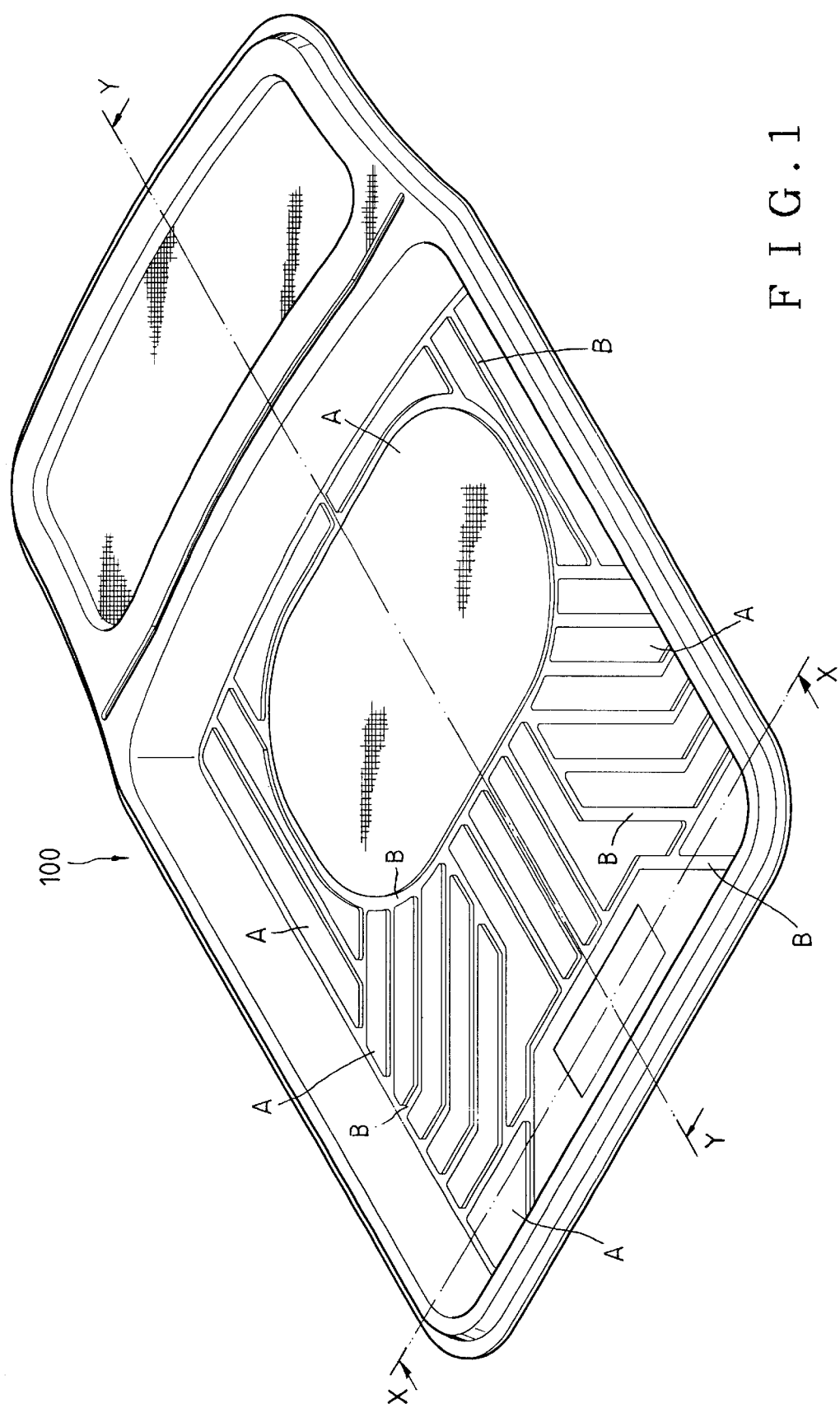
FIG. 1 is a perspective view of the improved mat used in cars of this invention.
Figure 2:
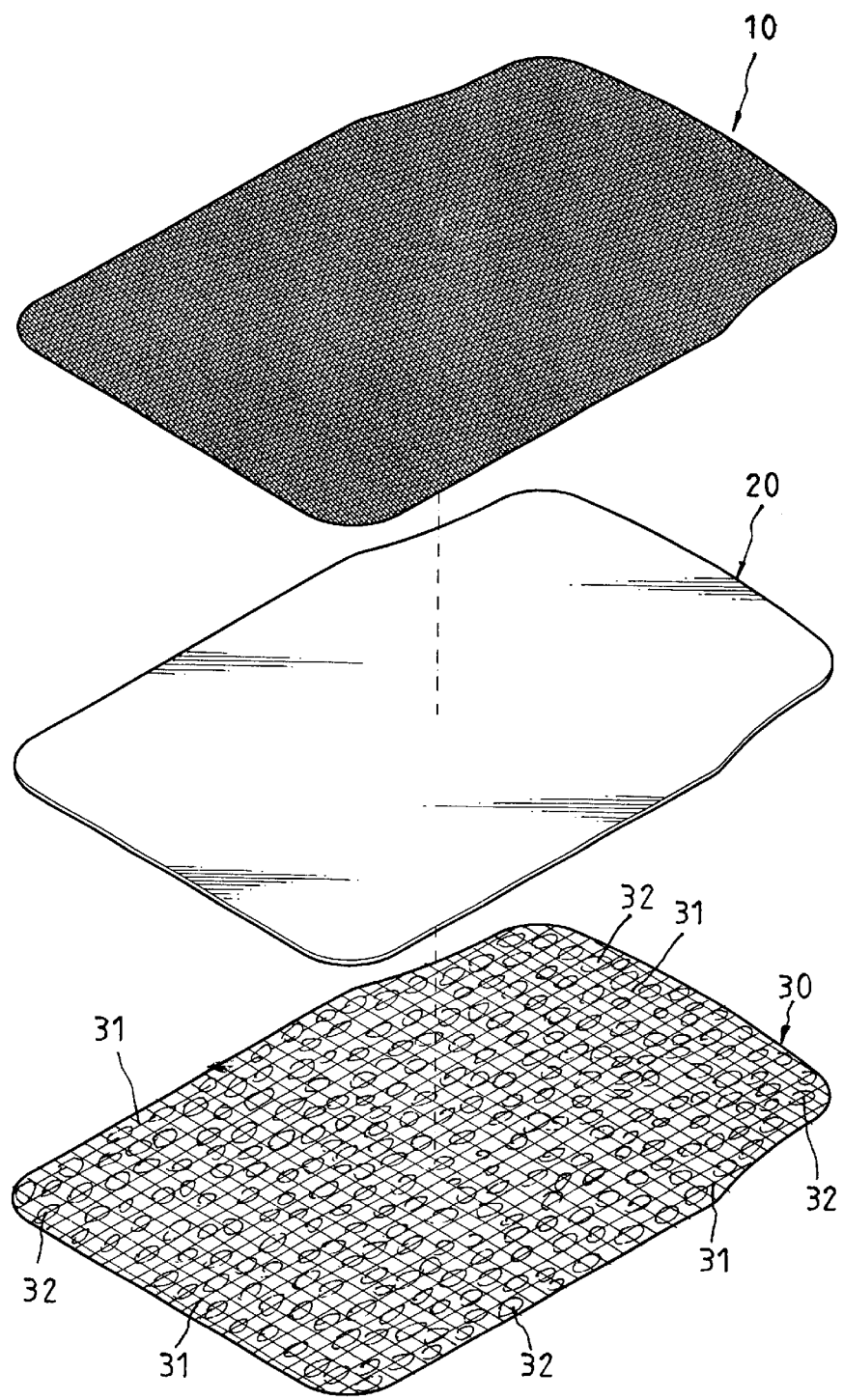
FIG. 2 is a structure view of the unformed mat of this invention.

The material of the above mentioned middle polyvinglchloride (PVC) plate (20) is a flexible, light weight, and waterproof Polyethylene (PE) or Polyethylene Ethylene Vinyl Acetate (EVA) foam. The above mentioned net lining (30) is composed of multiple yarns or threads (31) woven or knotted in a combination of both transverse and longitudinal ways to form a net fabric. This net fabric is dipped and coated with plastic (PVC etc.) resins, which are formulated with foaming agent. This coated fabric after being treated by a heat foaming process, will have a continuous sponge foam covering 32 formed on the thread or yarn 31 surface in a suitable thickness and on each knot at the thread crossing points. The improved car floor mat (100) of this invention is formed by placing the net lining (30) with multiple foam particle (32), aforesaid middle polyvinglchloride (PVC) plastic layer (20), and the upper polyester fabric layer (10) together, and binding or gluing the three layers together to form a whole mat as shown in FIG. 1.

Figure 3:
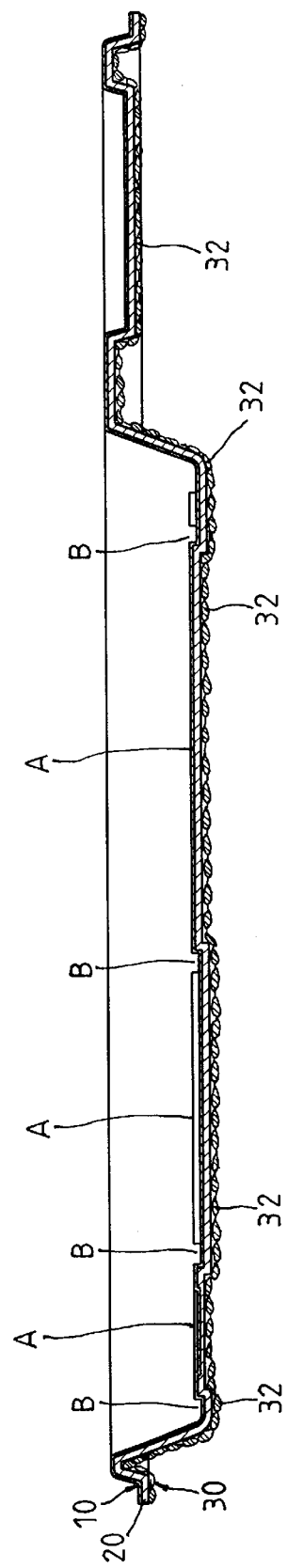
FIG. 3 is an Y—Y section view of the improved mat used in cars of this invention.
Figure 4:
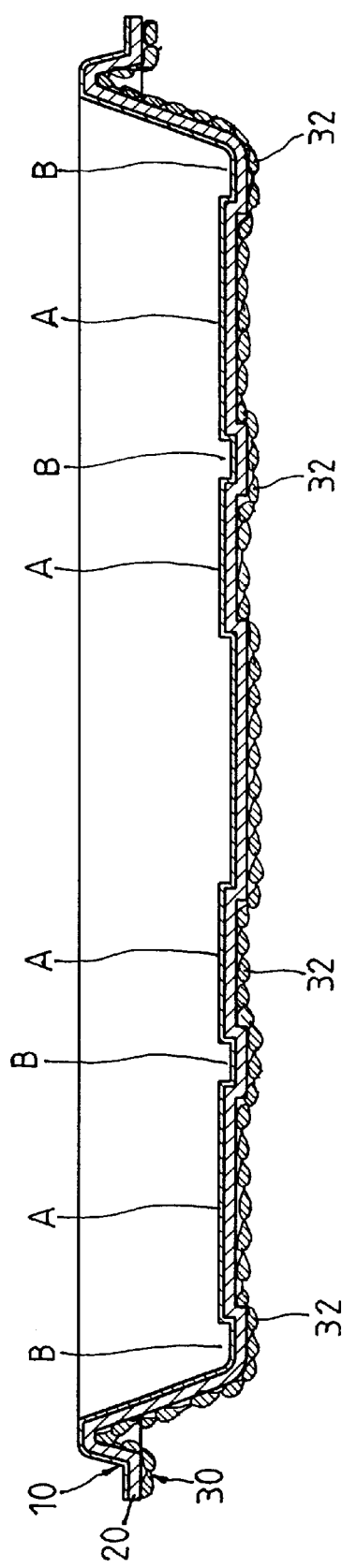
FIG. 4 is an X—X section view of the improved mat used in cars of this invention.

The plate-shaped object of the above mentioned mat (100) is formed by multiple symmetrical umbos(A) which can be designed as rectangle, quarry, or figure etc. There are multiple symmetrical bevel grooves (B) formed between these umbos (A) so as to be depressed below the mat upper surface to thereby receive the sludge, gravel, and rainwater that is tracked on the mat (100), by the person's shoes. The person's shoe can be scraped on the umbos (A), to move dirt into grooves (B) for collection. When convenient, the person can take the mat out for washing or cleaning. At the same time, the muck will not dirty the carpet because of the design of the plate-shaped mat. The mat will keep the carpet clean, and will not deface the inside of the car. As shown in FIGS. 1, 3 and 4, the mat has a peripheral upstanding rim for containment of water sludge and debris. The rim has an inverted V cross-section for strengthening purposes.

There are multiple foam particles (32) on the under net lining (30) of the mat (100) of this invention. The multiple foam particles (32) of the mat (100) will cling to the fibers of the carpet under the mat (100), and create a desired drag between the mat and carpet, so that the mat will not move on the carpet.

From the above description, it will be seen that the structure of the mat (100) is simple, but novel in design, through the use of three different kinds of material, i.e. a polyester fabric (10), a polyvinglchloride (PVC) plate (20), and a foam-coated net lining (30).

What is claimed is:

1. A one piece floor mat for use in automotive vehicles, comprising:

a three layer laminated mat body that includes a middle layer, upper layer, and lower layer bonded together at the interfaces between said layers;

said middle layer comprising a flexible impermeable plastic sheet that is impervious to liquid flow therethrough;

said upper layer comprising a woven plastic sheet bonded to the upper surface of said middle layer;

said lower layer comprising a woven net fabric coated with a plastic foam, said lower layer being bonded to the lower surface of said middle layer;

said laminated mat body being embossed to form multiple water collection grooves on the mat body upper surface.

2. The floor mat of claim 1, wherein said laminated mat body has a peripheral upstanding rim for containment of water sludge and debris collected on the mat body, said rim having an inverted V cross-section.

* * * * *